United States Patent Office 3,155,678
Patented Nov. 3, 1964

3,155,678
CERTAIN ISOTHIAZOLE COMPOUNDS AND
THEIR PRODUCTION
William R. Hatchard, Wilmington, Del., assignor to E. I. du Pont de Nemours and Company, Wilmington, Del., a corporation of Delaware
No Drawing. Filed Nov. 14, 1961, Ser. No. 152,174
8 Claims. (Cl. 260—302)

This invention relates to new heterocyclic compounds having sulfur and nitrogen as members of the heterocyclic ring. More particularly, it relates to, and has as its principal objects, the provision of new isothiazoles and a new method of preparing them.

This application is a continuation-in-part of my application Serial No. 72,323, filed November 29, 1960, and now abandoned.

Compounds having the isothiazole structure, that is, the structure

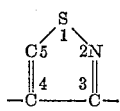

(the ring atoms are numbered for easier reference) have been unknown until quite recently except in the form of bicyclic compounds where the isothiazole nucleus is fused to a benzene nucleus, i.e., benzoisothiazoles. It was only in 1956 that isothiazoles wherein the ring carbon atoms bear monovalent substituents were first reported by Adams and Slack (Chemistry & Industry 1956, 1232). Little is known of the chemistry of isothiazoles, and a study of these compounds is highly desirable both from scientific and practical standpoints.

The new compounds made available by this invention are the isothiazoles of the general formula (I)

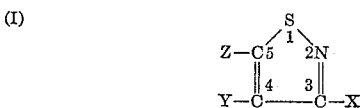

where X is chlorine or bromine; Y is carboxyl or a group known by those skilled in the chemical arts to be hydrolyzable to the carboxyl group, especially a cyano, halocarbonyl, amido or ester group; and Z is X or Q, Q being one of the radicals OR, SR, $NH_2$, NHR, $NR_2$, $NHNH_2$, and NHNHR, the symbol R in these radicals representing a hydrocarbon or halohydrocarbon group.

These products are prepared by a one- or two-step process as follows:

The products of the above Formula I where Y is cyano and Z is halogen (that is, Z=X=chlorine or bromine) are prepared by treating an alkali metal mercaptide of 2,2-dicyano - 1,1 - dimercaptoethylene with a halogenating (chlorinating or brominating) agent, whereby a 4-cyano-3,5-dihaloisothiazole is obtained in accordance with the following Equation 1, where the reactants shown are a free halogen X (e.g., chlorine) and the 2,2-dicyano-1,1-dimercaptoethylene salt of an alkali metal M:

(1)

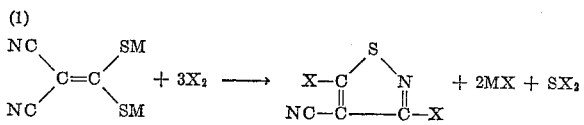

The products of Formula I where Z is Q can be prepared by a second step in which the 4-cyano-3,5-dihalo-iso-thiazole obtained by step 1 is reacted with a nucleophilic reagent of the general formula HQ, where Q is OR, SR, $NH_2$, NHR, $NR_2$, $NHNH_2$, or NHNHR, the symbol R having the previously stated significance, in accordance with the equation (2)

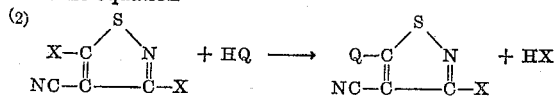

Other products falling within the scope of this invention are those in which the cyano substituent in the 4-position is replaced by a carboxyl group or a group hydrolyzable thereto. The groups which are hydrolyzable to a carboxyl group attached directly to the 4-carbon atom include the halocarbonyl group; the amido group, including the aminocarbonyl, or carbamoyl group (—$CONH_2$), and the N-substituted carbamoyl groups, such as N-hydrocarbylcarbamoyl; and the ester groups, such as N-hydrocarbyloxycarbonyl. These products can be derived from the compounds having a cyano group in the 4-position by the methods of hydrolysis, amidation or esterification known to effect conversion of the cyano group to such groups. The amido derivatives can alternatively be prepared by reacting a 4-amido-3,5-dihaloisothiazole with a nucleophilic reagent HQ, as previously defined, whereby the halogen in the 5-position is replaced by the group Q. These various methods are illustrated in the specific examples which follow.

The nomenclature used for these products hereafter will normally be that where the nitrile or related substituent in the 4-position appears as the suffix, for example, 3,5-dichloro-4-isothiazolecarbonitrile.

Of the starting materials used in the preparation of the isothiazoles of this invention, the only ones that require special mention are the alkali metal salts of 2,2-dicyano-1,1-dimercaptoethylene. Their preparation as intermediates, but not their isolation, is described in U. S. Patent 2,533,233. The sodium salt is more conveniently prepared and isolated by the following modification of the described procedure.

Malononitrile (66 g., 1 mole) was added slowly to a suspension of 80 g. (2 moles) of sodium hydroxide in 900 ml. of 95% alcohol while the temperature of the mixture was maintained below 40° C. Then carbon disulfide (76 g., 1 mole) was added dropwise with cooling over a period of 30 minutes. The heavy, yellow slurry was stirred an additional hour at room temperature and filtered. The yellow residue was triturated in alcohol, collected on a filter and dried in a vacuum oven at 80° C./1 mm. for 24 hours. There was obtained 180 g. (98% yield) of 2,2-dicyano-1,1-disodiomercaptoethylene, $(NC)_2C=C(SNa)_2$.

*Analysis.*—Calc'd for $C_4N_2S_2Na_2$: S, 34.40. Found: S, 32.16.

This is the preferred starting material for use in the process of this invention, but other alkali metal salts, especially the potassium salt, which can be prepared in a similar manner, are also suitable.

The preferred halogenating agents are the free halogens, chlorine or bromine, and especially chlorine. However, other halogenating agents which are suitable, though somewhat less effective, are e.g., the thionyl halides ($SOCl_2$, $SOBr_2$), the sulfuryl halides ($SO_2Cl_2$, $SO_2Br_2$) and phosphorus halides ($PCl_5$ and $PBr_3$).

The preparation of the 3,5-dihalo-4-isothiazolecarbonitriles, that is, step (1) of the above-described process is carried out simply by bringing into contact the halogenating agent and the 2,2-dicyano-1,1-di(alkalimetal)-mercaptoethylene in a mole ratio of at least 3:1 and preferably in excess thereover. This reaction proceeds rapidly. Also, it is exothermic and can, therefore, take place at a very low external temperature, e.g., of the order of —50° C. The reaction temperature is not critical, but it is preferred to adjust the operating conditions, using external cooling if necessary, so that the temperature of the reaction mixture does not exceed about 100° C. A solvent or diluent is not essential, especially when use is made of a normally liquid halogenating agent. However, the reaction is most conveniently conducted in a medium which, at the operating temperature, is liquid, dissolves the reactants to at least a small extent, e.g., 0.1% by weight, and is not appreciably reactive towards the reactants and reaction products. For this purpose, organic solvents free of active hydrogen (i.e., hydrogen attached to an element other than carbon) are generally suitable. Examples of such reaction media include acylic or cyclic ethers such as di-n-butyl ether, 1,2-dimethoxyethane, 1,2-diethoxyethane, tetrahydrofuran, dioxane; halogenated hydrocarbons such as carbon tetrachloride, tetrachloroethylene, chlorobenzene; nitriles such as acetonitrile, propionitrile, benzonitrile; tetramethylene cyclic sulfone; and the like. When it is used, the amount of liquid diluent is immaterial provided it is sufficient to maintain the solid reactants and reaction products in partial solution or suspension.

The resulting 3,5-dihalo-4-isothiazolecarbonitrile is recovered from the reaction mixture by any appropriate conventional means. These products are solids which, however, can be distilled. Most conveniently, the inorganic salt is separated by filtration and the reaction product is separated from the diluent and sulfur halide by fractionation. Alternatively, the solvent, if any, is evaporated and the residue extracted with a solvent for the isothiazole.

In a step (2) of the process of this invention, a 3,5-dihalo-4-isothiazolecarbonitrile, preferably the dichloro compound, is reacted with a nucleophilic reactant of the class defined above. In this reaction, the halogen atom in the 5-position is replaced by another substituent, whereas the halogen atom in the 3-position remains unaffected. Step (2) of the process may be carried out by adding the nucleophilic agent to the product mixture from step (1), i.e., it is not necessary to first isolate the 3,5-dihalo-4-isothiazolecarbonitrile before carrying out step (2). The preferred nucleophilic reactants are the following:

(a) The compounds ROH (alcohols and phenols) where R is a hydrocarbon or halohydrocarbon group of 1-12 carbon atoms. Examples of such compounds include methyl, ethyl, isopropyl, n-butyl, tert.-butyl, n-amyl, n-hexyl, n-nonyl, n-dodecyl, allyl, crotyl and propargyl alcohol, geraniol, cyclopentanol, cyclohexanol, β-cyclohexylethanol, benzyl and phenylethyl alcohols, 2-chloroethanol, 2,2,2-tribromoethanol, 2,2,3,3,-tetrafluoropropanal, 1-bromo-5-hexanol, 2-chlorocyclopentanol, p-chlorobenzyl alcohol, phenol, o-cresol, p-butylphenol, α-naphthol, β-naphthol, p-chlorophenol, p-fluorophenol, 2,6-dichlorophenol, and the like.

(b) The compounds RSH (thiols and thiophenols) where R is a hydrocarbon or halohydrocarbon group of 1-12 carbon atoms, including, for example, methyl, propyl, isobutyl, n-hexyl, n-decyl, n-dodecyl, allyl, 1-cyclopentenyl, cyclohexyl, benzyl, phenylethyl and β-chloropropyl mercaptans, 1,1,7-trihydroperfluoroheptanethiol, thiophenol, m-thiocresol, p-isopropylthiophenol, α-thionaphthol, o-bromothiophenol, o-iodothiophenol, m-trifluoromethylthiophenol, and the like.

(c) Ammonia or a primary or secondary amine, $RNH_2$ and $R_2NH$ where R is a hydrocarbon or halohydrocarbon group of 1-12 carbon atoms (such groups can be alike or different in a secondary amine). Examples of suitable amines include methyl, ethyl, N,N-diethyl, n-butyl, N-methyl-N-isopropyl, isoamyl, N,N-di-n-hexyl, N-ethyl-N-hexyl, octyl, n-dodecyl, methallyl, N,N-diallyl, cyclopentyl, cyclohexyl, β-cyclohexylethyl, N,N-dicyclohexyl, benzyl, α-phenylethyl, α-bromopropyl and o-chlorocyclohexyl amines, aniline, N-methylaniline, o-aminostyrene, o-toluidine, p-fluoroaniline, o-aminobenzyl bromide, and the like.

(d) Hydrazine and substituted hydrazines of the formula $NH_2NHR$ where R is a hydrocarbon or halohydrocarbon group of 1-12 carbon atoms, including, for example, methyl, ethyl, isobutyl, n-hexyl, n-octyl, n-dodecyl, allyl, cyclohexyl, benzyl, phenyl, α-naphthyl, p-fluorophenyl and 2,4-dibromophenyl hydrazines, and the like.

This step of the process is performed by maintaining the nucleophilic reactant and the 3,5-dihalo-4-isothiazolecarbonitrile in contact, preferably though not necessarily in a molar ratio of at least 1:1, until reaction has taken place to at least some extent. The reaction is desirably conducted in the presence of at least a stoichiometric amount of an acceptor for the by-product hydrogen halide which forms. This acceptor may be an inorganic base, for example, an alkali or alkaline earth metal hydroxide or carbonate such as sodium hydroxide, potassium hydroxide, potassium carbonate, sodium bicarbonate, calcium hydroxide, magnesium carbonate, and the like; or an organic base, such as a primary, secondary or tertiary amine capable of forming an acid salt with the by-product hydrogen halide. When the nucleophilic reactant is ammonia or an amine or hydrazine, it is convenient to use an excess of it to serve as the acid acceptor.

The reaction conditions for step (2) are not critical. With the more reactive nucleophilic reagents such as amines and hydrazines the reaction proceeds at temperatures as low as 0° C. Mild heating is preferred to achieve more practical reaction rates, especially with the less active reagents, but it is in general unnecessary to operate above about 150° C., although this can be done if desired up to the decomposition point of the reactants. The most useful range of reaction temperature is that between 50 and 125° C. Under such conditions the reaction is practically completed within periods ranging from one to twenty hours, although it can, of course, be interrupted earlier. The reaction is most conveniently conducted at atmospheric pressure but it can be carried out in sealed vessels under superatmospheric pressures if desired.

Although this is not essential, the reaction is facilitated by the use of an organic liquid diluent capable of dissolving the reactants to at least some extent, e.g., 1% by weight. Such a reaction medium may be, for example, an excess of the nucleophilic reactant when the latter is a liquid at reaction temperature, or it may be any other suitable organic liquid, among which may be mentioned hydrocarbons and halohydrocarbons such as n-hexane, cyclohexane, toluene, carbon tetrachloride, chlorobenzene; carboxylic acid esters such as ethyl acetate, methyl benzoate; ketones such as acetone, methyl ethyl ketone; ethers such as di-n-butyl ether, 1,2-dimethoxyethane, tetrahydrofuran, dioxane; nitriles such as acetonitrile, benzonitrile; and other solvents such as acetic acid, tetramethylene sulfone, etc. Even reaction media which are themselves reactive, for example, alcohols such as methanol or ethanol, are suitable provided the nucleophillic reactant is appreciably more reactive toward the 3,5-dihalo-4-isothiazolecarbonitrile than the reaction medium. If the use of a reaction medium is to be beneficial it should be present in an amount sufficient to maintain the reaction mixture fluid and the inorganic materials in suspension.

The reaction products obtained in this step are, in general, solids which can be isolated by any appropriate means, for example by direct crystallization from the reaction mixture, or by evaporation of the solvent (with or without preliminary removal of any inorganic solids that may be present) followed by crystallization or solvent extraction, or by precipitation by a nonsolvent such as water, or by distillation under reduced pressure or steam distillation, or by any other conventional procedure.

Compounds in which the substituent in the 4-position, i.e., Y in Formula I above, is the carbamoyl group, are prepared by subjecting the 5-substituted-3-halo-4-isothiazolecarbonitrile to acid hydrolysis according to known methods. Preferably, sulfuric acid of 90-97% concentration is used at temperatures in the range of 50 to 125° C. Compounds in which the Y substituent is the carboxyl group can be made from the carbamoyl compounds by hydrolysis with nitrous acid in sulfuric acid; and the carboxyl group can be converted to the halocarbonyl (acid halide) group by treatment with one of the halogenating agents known to be suitable for this purpose, such as thionyl chloride, thionyl bromide, phosphorous tribromide, and the like. The acid halides, especially 3,5-dichloro-4-isothiazolecarbonyl chloride, are important compounds since they serve as intermediates in the synthesis, by known methods, of products of the invention where the substituent Y is a substituted amido group or an ester group.

Thus, the products where Y is an N-susbtituted carbamoyl group can be prepared by reacting the acid halide, e.g., the chloride with an amine having hydrogen on the amino nitrogen, preferably a hydrocarbylamine of up to 12 carbon atoms and particularly a primary amine R'NH$_2$ where R' is an acyclic hydrocarbon radical containing from 1 to 12 carbon atoms, a carbocyclic (cycloalkyl, aryl, aralkyl, alkaryl) radical of 6 to 12 carbon atoms, or an aryl radical bearing substituents such as the amino group or the benzotriazolyl group. Examples of suitable amines include methyl, ethyl, N-N-diethyl, isoamyl, n-octyl, n-dodecyl, allyl, cyclohexyl, benzyl, α-phenylethyl amine; aniline, N-methylaniline, the toluidines, β-naphthylamine, 4-aminodiphenyl, 2-(o-aminophenyl)-2H-benzotriazole, and the like.

Similarly, the products where Y is an ester group can be prepared by reacting the acid halide, e.g., the chloride with a reactant containing an alcoholic or phenolic hydroxyl, preferably a compound of the formula R"OH where R" is a hydrocarbon radical of 1 to 12 carbon atoms. Examples of suitable alcohols and phenols include methyl, ethyl, isopropyl, n-butyl, n-hexyl, n-dodecyl, allyl, crotyl and propargyl alcohols, cyclohexanol, phenol, the cresols, α-naphthol, benzyl alcohol, phenylethyl alcohol, and the like. The most preferred hydroxyl-containing reactants are the alkanols of 1 to 6 carbon atoms.

The invention is illustrated in greater detail by the following examples in which all pressures are atmospheric unless noted otherwise.

EXAMPLE I

*3,5-Dichloro-4-Isothiazolecarbonitrile*

To a slurry of 5.0 g. of 2,2-dicyano-1,1-disodiomercaptoethylene in 25 ml. of 1,2-dimethoxyethane was added 50 ml. of thionyl chloride. After the initial vigorous reaction, the reaction mixture was stirred overnight and then evaporated in a stream of nitrogen. Trituration of the residual red oil with petroleum ether and evaporation of the triturate yielded 0.49 g. of white rhombs that melted at 63.5–64.5° C. after being purified by sublimation. This was 3,5-dichloro-4-isothiazolecarbonitrile,

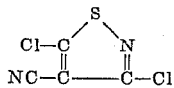

*Analysis.*—Calc'd for C$_4$N$_2$SCl$_2$: C, 26.8; S, 17.91; Cl, 39.6; mol. wt., 179. Found: C, 27.16; S, 17.86; Cl, 39.46; mol. wt., 196.

The ultraviolet absorption spectra in isooctane solution showed absorption maxima at 240, 263, and 270 mμ (shoulder) with molecular extinction coefficients of 4,650; 7,160 and 6,300, respectively. In the infrared, there were major absorption bands at 4.5, 6.65 and 7.52μ.

EXAMPLE II

*3,5-Dichloro-4-Isothiazolecarbonitrile*

To a stirred solution of chlorine in 1,2-di-methoxyethane (50 ml.) into which chlorine was passed continuously was added 10.0 g. of 2,2-dicyano-1,1-disodiomercaptoethylene portion-wise over about 15 minutes while the reaction mixture was cooled in ice. After the addition, the mixture was stirred an additional 15 minutes without cooling and was then filtered. Distillation of the filtrate yielded 3.4 g. of distillate, B.P. 65–70° C. at 1 mm. pressure, as oily crystals. Recrystallization from petroleum ether gave white rhombs, M.P. 64–65° C. of 3,5-dichloro-4-isothiazolecarbonitrile.

EXAMPLE III

This example illustrates the preferred mode of preparation of 3,5-dichloro-4-isothiazolecarbonitrile.

Chlorine gas was rapidly passed into a mixture of 110 g. of 2,2-dicyano-1,1-disodiomercaptoethylene in 800 ml. of distilled carbon tetrachloride for 2 hours. Heat evolution quickly heated the mixture to reflux for the first hour but during the second hour the reaction mixture cooled to about 40° C. The reaction mixture was filtered; the residue was washed with carbon tetrachloride; and the combined filtrate and washes were concentrated by distillation of the carbon tetrachloride. The distillation residue was subjected to steam distillation to give 60 g. (57%) of a white solid distillate, M.P. 64–65° C., consisting of essentially pure 3,5-dichloro-4-isothiazolecarbonitrile.

This product showed herbicidal activity, killing crabgrass, sorghum, alfalfa, mustard and marigold when applied to the soil at the rate of 16 lbs./acre.

When warmed with N,N-dimethylaniline, 3,5-dichloro-4-isothiazolecarbonitrile reacted to give a blue dye. Upon treatment with pyrrolealdehyde phenylhydrazone in dimethylformamide solution it gave a greenish-blue dye. Nylon, silk, cellulose acetate and wool swatches were dyed with these dyes to give fabrics having attractive colors.

EXAMPLE IV

*3,5-Dibromo-4-Isothiazolecarbonitrile*

To a stirred slurry of 37.2 g. (0.20 mole) of 2,2-dicyano-1,1-disodiomercaptoethylene in 400 ml. of carbon tetrachloride was added dropwise at room temperature 64 g. (0.4 mole) of bromine. The temperature of the reaction mixture rose to 30° C. during the addition (30 minutes). After being stirred another 75 minutes while being heated to 40–55° C., the reaction mixture was filtered and the filtrate was concentrated by rapid distillation under a Vigreux column. Bromine, carbon tetrachloride and probably sulfur bromide were distilled. The liquid residue (2.3 g.) was subjected to distillation at reduced pressure through a small head. This removed a small quantity of a red liquid, B.P. 40–45° C. at 1 mm., which was presumably sulfur monobromide. White crystals sublimed into the still head. This solid was collected and resublimed twice at 70° C. and 1 mm. pressure to give crystals melting at 98.3–98.6° C. This was 3,5-dibromo-4-isothiazolecarbonitrile,

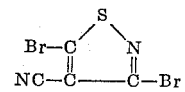

*Analysis.*—Calc'd for C$_4$N$_2$SBr$_2$: C, 17.91. Found: C, 18.75.

UV: $\lambda_{max.}^{CH_2Cl_2}$ 253 mμ (ε=6450), 267 mμ (ε=6850), shoulder at 274 mμ (ε=6040); IR: 4.48 mμ, 6.70μ and 7.65μ.

EXAMPLE V

*3-Chloro-5-Methoxy-4-Isothiazolecarbonitrile*

A mixture of 1 g. (5.5 mmole) of 3,5-dichloro-4-isothiazolecarbonitrile, 0.58 g. (5-5 mmole) of anhydrous sodium carbonate, and 50 ml. of methanol was heated under reflux overnight, concentrated under a helices column on a steam bath to a volume of about 20 ml. and diluted with a three-fold volume of water. The solid which separated was collected on a filter, dried in air and then subjected to sublimation at 65–80° C./1 mm. The white crystalline sublimate weighed 0.52 g. (60% yield)

and melted at 106.5–107.5° C. This was 3-chloro-5-methoxy-4-isothiazolecarbonitrile,

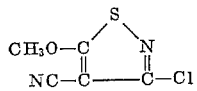

*Analysis.*—Calc'd for $C_5H_3ON_2ClS$: C, 34.4; H, 1.97; mol. wt., 174.5. Found: C, 34.16; H, 1.97; mol. wt., 174 (mass spec.)

UV: $\lambda_{max}^{alc.}$ 247 m$\mu$ ($\epsilon$ = 6300); IR: 4.5$\mu$ (conj. CN), 6.5$\mu$, and 6.8$\mu$ (C=C/C=NS).

This compound showed activity as a preemergence herbicide. It killed alfalfa and marigold when applied at the rate of 16 lbs./acre.

EXAMPLE VI

*3-Chloro-5-Ethoxy-4-Isothiazolecarbonitrile*

A mixture of 2.5 g. (14 mmole) of 3,5-dichloro-4-isothiazolecarbonitrile, 1.45 g. (14 mmole) of anhydrous sodium carbonate, and 25 ml. of ethanol was heated under reflux overnight, concentrated on a steam bath under a helices column and then diluted with water. The precipitated solid after collection and drying weighed 2.5 g. (96% yield), M.P. 58–59° C. An analytical sample purified by sublimation melted at 59.5–60.8° C. This product was 3-chloro-5-ethoxy-4-isothiazolecarbonitrile,

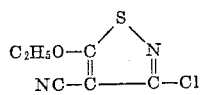

*Analysis.*—Calc'd for $C_6H_5ON_2SCl$: C, 38.21; H, 2.67. Found: C, 38.05; H, 2.94.

UV: $\lambda_{max}^{alc.}$ 248 m$\mu$ ($\epsilon$ = 6840); IR: 4.5$\mu$ (conj. CN), 6.5$\mu$ and 6.8$\mu$ (C=C/C=NS).

EXAMPLE VII

*3-Chloro-5-(p-Chlorophenoxy)-4-Isothiazolecarbonitrile*

A solution of 14.3 g. (0.08 mole) of 3,5-dichloro-4-isothiazolecarbonitrile in 20 ml. of 1,2-dimethoxyethane was added quickly at room temperature to a previously prepared solution of 10.02 g. (0.08 mole) of p-chlorophenol, 3.6 g. (0.079 mole) of sodium hydroxide and 250 ml. of 1,2-dimethoxyethane and the mixture was heated under reflux for three hours and then allowed to stand overnight. The reaction mixture was filtered and the filtrate was evaporated on a steam bath under reduced pressure. The residual solid was recrystallized from aqueous methanol to give 19.9 g. (92% yield) of white crystals, M.P. 87.5–88.5° C., of 3-chloro-5-(p-chlorophenoxy)-4-isothiazolecarbonitrile,

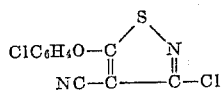

An analytical sample crystallized from methanol melted at 87.5–88.5° C.

*Analysis.*—Calc'd for $C_{10}H_4N_2OSCl_2$: C, 44.3; H, 1.47; Cl, 26.20. Found: C, 44.4; H, 1.72; Cl, 26.19.

UV: $\lambda_{max}^{alc.}$ 252 m$\mu$ ($\epsilon$ = 10,000); IR: 4.5$\mu$ (conj. CN), 6.5$\mu$ and 6.75$\mu$ (C=C/C=NS).

This product was found to be effective as a postemergence herbicide when applied as an over-all spray at the rate of 16 lbs./acre.

EXAMPLE VIII

*3-Chloro-5-Phenylthio-4-Isothiazolecarbonitrile*

A solution of 1.79 g. (0.01 mole) of 3,5-dichloro-4-isothiazolecarbonitrile in 10 ml. of methanol was added to a previously prepared solution of 1.10 g. (0.01 mole) of thiophenol and 0.4 g. (0.01 mole) of sodium hydroxide in 35 ml. of methanol and the mixture was heated under reflux for 2 hours. The yellow reaction mixture was concentrated by evaporation and diluted with water. The precipitated solid after collection and recrystallization from methanol weighed 1.2 g. (50% yield), M.P. 104.5–108.5° C. A second recrystallization from methanol after treatment with decolorizing charcoal gave a product which melted at 108.5–110.2° C. The product thus obtained was 3-chloro-5-phenylthio-4-isothiazolecarbonitrile,

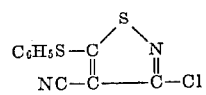

*Analysis.*—Calc'd. for $C_{10}H_5N_2S_2Cl$: C, 47.56; H, 1.98; N, 11.10; S, 25.40. Found: C, 46.12; H, 1.99; N, 10.95; S, 25.32.

UV: $\lambda_{max}^{alc.}$ 287 m$\mu$ ($\epsilon$ = 9450), shoulder 274 m$\mu$; IR: 4.5$\mu$ (CN), 6.75$\mu$ and 6.8$\mu$ (C=C/C=N).

This product showed activity as a postemergence herbicide when applied as an over-all spray at the rate of 16 lbs./acre.

EXAMPLE IX

*3-Chloro-5-Methylthio-4-Isothiazolecarbonitrile*

A mixture of 4.5 g. (0.025 mole) of 3,5-dichloro-4-isothiazolecarbonitrile, 4.8 g. (0.068 mole) of methanethiol and 5.4 g. of sodium methoxide (containing some sodium carbonate) in 200 ml. of 1,2-dimethoxyethane was heated to reflux with stirring for about 16 hours. The reaction mixture was evaporated under reduced pressure and the residue was taken up in a mixture of water and diethyl ether. The ether layer was separated, washed with water, dried over magnesium sulfate and evaporated, leaving a dark oily residue. Extraction of this oil with boiling petroleum ether yielded shiny, white platelets melting at 65–70° C., of 3-chloro-5-methylthio-4-isothiazolecarbonitrile,

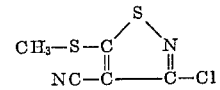

An analytical sample recrystallized from petroleum ether melted at 68–71° C.

*Analysis.*—Calc'd. for $C_5H_3ClN_2S_2$: C, 31.49; H, 1.58. Found: C, 32.80; H, 1.72.

UV: $\lambda_{max}^{alc.}$ 228 m$\mu$ ($\epsilon$ = 10,400), 222 m$\mu$ ($\epsilon$ = 12,500); IR: 5.76$\mu$, 7.45$\mu$, 7.60$\mu$.

This compound was also prepared, in somewhat higher purity (M.P. 75–76° C.) by the following reaction sequence:

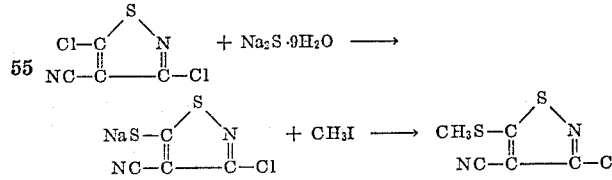

EXAMPLE X

*3-Chloro-5-Anilino-4-Isothiazolecarbonitrile*

A mixture of 10 g. (0.056 mole) of 3,5-dichloro-4-isothiazolecarbonitrile, 20.8 g. (0.22 mole) of aniline and 70 ml. of glacial acetic acid was warmed on a steam bath for 2 hours and allowed to stand overnight at room temperature and then poured into 350 ml. of water. The precipitated solid was collected and recrystallized from methanol to give 10.5 g. (80% yield) of white crystals, M.P. 185–190° C., of 3-chloro-5-anilino-4-isothiazolecarbonitrile,

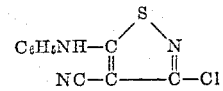

An analytical sample, purified by sublimation at 190° C./ 1 mm., melted at 193–193.5° C.

*Analysis.*—Calc'd. for $C_{10}H_6N_3SCl$: N, 17.8; Cl, 15.1. Found: N, 17.2; Cl, 14.8.

UV: $\lambda_{max.}^{CH_2Cl_2}$ 301 m$\mu$ ($\epsilon$ = 14,600); IR: 3.08$\mu$ (NH), 4.47$\mu$ (CN).

EXAMPLE XI

3-Chloro-5-(p-Chloroanilino)-4-Isothiazolecarbonitrile

A mixture of 1.6 g. (8.95 mmole) of 3,5-dichloro-4-isothiazolecarbonitrile, 2.5 g. (19.6 mmole) of p-chloroaniline, and 50 ml. of methanol was heated under reflux overnight, cooled and filtered to give 1.95 g. of white needles, M.P. 260–265° C. Concentration of the filtrate and dilution with water yielded an additional 0.37 g. (total yield 96%) of 3-chloro-5-(p-chloroanilino)-4-isothiazolecarbonitrile,

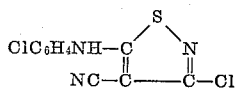

An analytical sample crystallized from an acetone-methanol mixture melted at 261–263° C.

*Analysis.*—Calc'd. for $C_{10}H_5N_3Cl_2S$: C, 44.44; H, 1.85; S, 11.7; mol. wt., 270. Found: C, 44.57; H, 2.16; S, 10.93; mol. wt., 230, 240 (ebull. acetone).

UV: $\lambda_{max.}^{alc.}$ 301 m$\mu$ ($\epsilon$ = 15,700), 227 m$\mu$ ($\epsilon$ = 19,700); IR: 3.1$\mu$ (NH), 4.49$\mu$ (CN), 6.25$\mu$, and 6.7$\mu$ (aromatic CH), 12.5$\mu$ (aromatic p-substitution).

This product was effective as a preemergence herbicide when applied to the soil at the rate of 16 lbs./acre.

EXAMPLE XII

3-Chloro-5-(N-Methylanilino)-4-Isothiazolecarbonitrile

A mixture of 9.0 g. (0.05 mole) of 3,5-dichloro-4-isothiazolecarbonitrile, 10.7 g. (0.10 mole) of N-methylaniline and 200 ml. of methanol was heated under reflux for 3 hours and allowed to stand at room temperature for 2 days. The reaction mixture was evaporated to dryness under reduced pressure and the residue was taken up in a mixture of water and diethyl ether. The ether layer was washed with water and with dilute hydrochloric acid, dried over magnesium sulfate and evaporated to dryness. Crystallization of the residue from methanol gave 10.7 g. (85% yield) of 3-chloro-5-(N-methylanilino)-4-isothiazolecarbonitrile,

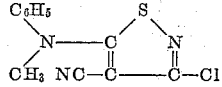

An analytical sample recrystallized from ethanol melted at 94.5–95° C.

*Analysis.*—Calc'd. for $C_{11}H_8N_3ClS$: C, 52.91; H, 3.32. Found: C, 53.06; H, 3.32.

UV: $\lambda_{max.}^{alc.}$ 282 m$\mu$ ($\epsilon$ = 10,800), 222 m$\mu$ ($\epsilon$ = 19,500); IR: 4.5$\mu$, 6.25$\mu$, 6.3$\mu$, 6.4$\mu$, 6.7$\mu$, and 7.6$\mu$.

EXAMPLE XIII

3-Chloro-5-Amino-4-Isothiazolecarbonitrile

Dry ammonia gas was passed into a solution of 10.0 g. (0.056 mole) of 3,5-dichloro-4-isothiazolecarbonitrile in 500 ml. of purified tetrahydrofuran for 7 hours while the mixture was heated under reflux. After being allowed to stand at room temperature overnight, the reaction mixture was filtered from 2.89 g. of ammonium chloride and concentrated by evaporation. The addition of 50 ml. of benzene and cooling caused crystallization of 5.81 g. of tan solid and further concentration yielded a second crop of crystals, weight 2.36 g. (total yield 92%), M.P. 208–209° C. An analytical sample purified by sublimation at 200° C./1 mm. melted at 210–212° C. This was 3-chloro-5-amino-4-isothiazolecarbonitrile,

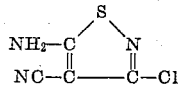

*Analysis.*—Calc'd for $C_4H_2N_3SCl$: C, 30.12; H, 1.25; N, 26.35; mol. wt., 159.5. Found: C, 30.50; H, 1.46; N, 26.69; mol. wt., 148.

UV: $\lambda_{max.}^{CH_2Cl_2}$ 259 m$\mu$ ($\epsilon$ = 7930); IR: 2.95$\mu$, 3.05$\mu$, 3.15$\mu$, 6.05$\mu$, (NH$_2$/NH), 4.5$\mu$, (CN), 6.5$\mu$ (C=C/C=NS).

A sample of this amine was diazotized with sodium nitrite in concentrated hydrochloric acid. Reaction of the filtered diazotization mixture with an aqueous alkaline solution of $\beta$-naphthol produced a pink solution from which cellulose acetate, nylon, silk and wool could be dyed. The product of this example was further useful as a preemergence herbicide, killing crabgrass, wild oats, alfalfa, mustard and marigold when applied at the rate of 16 lbs./acre.

EXAMPLE XIV

3-Chloro-5-Methylamino-4-Isothiazolecarbonitrile

Gaseous, anhydrous monomethylamine was passed through a sintered glass tube into a solution of 5.0 g. of 3,5-dichloro-4-isothiazolecarbonitrile in 200 ml. of tetrahydrofuran for 2 hours, during which the heat of the reaction kept the mixture at 30–50° C. The reaction mixture was filtered from about 2 g. of methylamine hydrochloride and the filtrate was evaporated to dryness under reduced pressure. Crystallization of the residue gave 4.7 g. (98% yield) of 3-chloro-5-methylamino-4-isothiazolecarbonitrile,

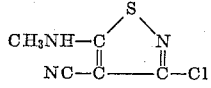

M.P. 198–199° C. An analytical sample recrystallized from methanol melted at 199–200° C.

*Analysis.*—Calc'd for $C_5H_4N_3SCl$: C, 34.59; H, 2.32; S, 18.40. Found: C, 35.06; H, 2.50; S, 18.67.

UV: $\lambda_{max.}^{alc.}$ 270 m$\mu$ ($\epsilon$ = 10,600), 219 m$\mu$ ($\epsilon$ = 21,000); IR: 3.15$\mu$, 3.2$\mu$ (—NH), 4.5$\mu$ (CN), 6.3$\mu$, 6.75$\mu$, 7.1$\mu$, 7.65$\mu$ and 9.4$\mu$.

EXAMPLE XV

3-Chloro-5-Dimethylamino-4-Isothiazolecarbonitrile

Anhydrous dimethylamine gas was passed through a sintered glass tube into a mixture of 10.0 g. of 3,5-dichloro-4-isothiazolecarbonitrile and 250 ml. of tetrahydrofuran. Heat evolution ceased after about 5 minutes and the mixture was maintained at 45–50° C. for 4 hours with external heat. The reaction mixture was filtered from dimethylamine hydrochloride and the filtrate was evaporated under reduced pressure. Recrystallization from aqueous methanol gave 9.3 g. (86% yield) of 3-chloro-5-dimethylamino-4-isothiazolecarbonitrile

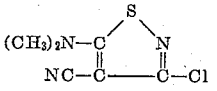

M.P. 103.5–104.5° C. An analytical sample purified by sublimation at 120° C. and 1 mm. melted at 103.5–104.8° C.

*Analysis.*—Calc'd for $C_6H_6N_3SCl$: C, 38.21; H, 3.22; S, 17.09. Found: C, 38.36; H, 3.29; S, 17.10.

UV: $\lambda_{max.}^{alc.}$ 277 m$\mu$ ($\epsilon$ = 11,400), 221 m$\mu$ ($\epsilon$ = 20,400); IR: 3.4$\mu$, 3.5$\mu$, 3.55$\mu$, 4.5$\mu$, 6.4$\mu$, 6.7$\mu$ and 7.65$\mu$.

EXAMPLE XVI

3-Chloro-5-Hydrazino-4-Isothiazolecarbonitrile

Ten grams (0.20 mole) of hydrazine hydrate in 25 ml. of methanol was added dropwise to a stirred solution of 17.9 g. (0.10 mole) of 3,5-dichloro-4-isothiazolecarbonitrile in 250 ml. of methanol at room temperature. After a slight heat evolution, the mixture was stirred for 3 hours at room temperature and the crystalline solid which had formed was collected by filtration. A second crop of crystals was obtained by concentration of the filtrate at reduced pressure and cooling. This crop weighed 5.79 g. of which 2.04 g. was insoluble in water. The combined weight of water insoluble material was 16.0 g. (total yield 91%). An analytical sample after two recrystallizations from methanol melted with gas evolution when placed in a bath at 150° C. This product was 3-chloro-5-hydrazino-4-isothiazolecarbonitrile,

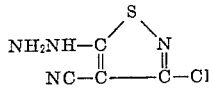

*Analysis.*—Calc'd for $C_4H_3N_4ClS$: C, 27.5; H, 1.72; S, 18.3. Found: C, 27.84; H, 1.80; S, 18.60.

UV: $\lambda_{max.}^{alc.}$ 268 m$\mu$ ($\epsilon$ = 9700), 220 m$\mu$ ($\epsilon$ = 21,000); IR: much 3.0–3.5$\mu$ absorption, strong absorption at 6.61$\mu$.

This amine gave dyes when reacted with $\beta$-naphthol in the presence of alkaline potassium ferricyanide, or with N,N-dimethylaniline in the presence of aqueous ferric chloride, or with benzoquinone in alcohol. The dye from $\beta$-naphthol in neutral dispersed system dyed nylon to a wine shade; in alkaline bath it gave fade-resistant orange shades on cellulose acetate and violet shades on wool. The dye from N,N-dimethylaniline in dispersed systems imparted a deep violet color to cellulose acetate and deep blue colors to nylon, silk and wool. The dye from benzoquinone, a brown solid, dyed nylon and wool deeply to maroon shades.

The product of this example showed growth-retarding activity when tested on xanthium, a typical noxious weed, and millet, a typical grass used to detect such activity.

EXAMPLE XVII

*3-Chloro-5-($\beta$-Phenylhydrazino)-4-Isothiazolecarbonitrile*

A mixture of 8.95 g. (0.05 mole) of 3,5-dichloro-4-isothiazolecarbonitrile and 10.8 g. (0.10 mole) of phenylhydrazone in 75 ml. of methanol was heated under reflux for 2 hours and then evaporated at reduced pressure to give a whitish-yellow solid. This residue was triturated in water to give 12.4 g. (100% yield) of white, water-insoluble solid that melted at 135° C. with decomposition to a red melt. An analytical sample prepared by crystallization from methanol melted with decomposition at 130° C. The product so obtained was 3-chloro-5-($\beta$-phenylhydrazino)-4-isothiazolecarbonitrile,

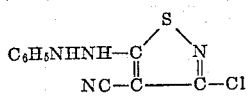

*Analysis.*—Calc'd for $C_{10}H_7N_4SCl$: C, 47.98; H, 2.81; N, 22.32; S, 12.78. Found: C, 47.44; H, 3.07; N, 24.54; S, 12.80.

UV: $\lambda_{max.}^{CH_2Cl_2}$ 268 m$\mu$ ($\epsilon$ = 10,600); IR: 3.07–3.5$\mu$ (broad band), 4.50$\mu$ (conj. CN).

This product was effective as a preemergence herbicide, killing crabgrass when applied at the rate of 16 lbs./acre. In addition, an alcohol solution of the above-mentioned red melt was used to dye cellulose acetate cloth, to which it imparted a gold color.

EXAMPLE XVIII

*3,5-Dichloro-4-Isothiazolecarboxamide*

Fifteen grams of 3,5-dichloro-4-isothiazolecarbonitrile was dissolved in 16 ml. of concentrated sulfuric acid and 4 ml. of water. The mixture was heated on the steam bath for 20 minutes, allowed to stand overnight at room temperature, again heated on the steam bath for 30 minutes and then poured into ice water. The precipitated solid was collected and subjected to sublimation at 80–90° C. and 1 mm. to give as a sublimate 6.6 g. of unreacted starting material, M.P. 61.5–64° C. The sublimation residue after recrystallization from methanol yielded 7.0 g. (75% yield) of white crystals, M.P. 160–163° C., of 3,5-dichloro-4-isothiazolecarboxamide,

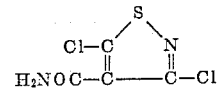

An analytical sample recrystallized from methanol melted at 168–168.5° C.

*Analysis.*—Calc'd for $C_4H_2N_2SCl_2O$: C, 24.36; H, 1.01; N, 14.21. Found: C, 24.39; H, 0.96; N, 13.34.

UV: $\lambda_{max.}^{alc.}$ 256 m$\mu$ ($\epsilon$ = 6550), 259 m$\mu$ ($\epsilon$ = 6680); IR: 3.0$\mu$ and 3.15$\mu$ ($NH_2$), 6.05$\mu$ (CO), 6.15$\mu$ ($NH_2$), 6.6$\mu$; (C=C/C=N).

When applied to the soil at the rate of 16 lbs./acre, this product showed considerable growth retardation on cotton and several other test plants in preemergence tests.

EXAMPLE XIX

*3-Chloro-5-Amino-4-Isothiazolecarboxamide*

A solution of 0.2 g. of 3-chloro-5-amino-4-isothiazolecarbonitrile in 0.8 ml. of concentrated sulfuric acid was warmed on a steam bath for 15 minutes and poured into ice water. There was obtained a white solid precipitate of 3-chloro-5-amino-4-isothiazolecarboxamide,

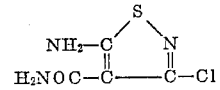

which after collection and drying weighed 0.20 g. and melted at 196–197° C.

*Analysis.*—Calc'd for $C_4H_4N_3ClSO$: C, 27.05; H, 2.28. Found: C, 27.60; H, 2.50.

UV: $\lambda_{max.}^{alc.}$ 222 m$\mu$ ($\epsilon$ = 24,500), 267 m$\mu$ ($\epsilon$ = 9450); IR: 3.0$\mu$, 6.3$\mu$ ($NH_2$), 6.05$\mu$ (C=O—N).

EXAMPLE XX

*3-Chloro-5-Methoxy-4-Isothiazolecarboxamide*

A solution of 1.0 g. of 3-chloro-5-methoxy-4-isothiazolecarbonitrile and 2 ml. of concentrated sulfuric acid was heated on the steam bath for 30 minutes and then poured into an ice-water mixture. The mixture was extracted with methylene chloride and chloroform. The extracts were combined and washed with a 5% aqueous sodium carbonate solution, dried over magnesium sulfate and evaporated. There was obtained 0.15 g. of white needles, M.P. 184–185° C. of 3-chloro-5-methoxy-4-isothiazolecarboxamide,

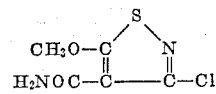

An analytical sample recrystallized from ethanol melted at 185–186° C.

*Analysis.*—Calc'd for $C_5H_5O_2N_2ClS$: C, 31.18; H, 2.61. Found: C, 31.44; H, 2.68.

The ultraviolet spectrum in methylene chloride showed a maximum at 244 m$\mu$ ($\epsilon$ = 6250). The infrared spectrum showed the presence of an amide function and was consistent with the assigned structure.

The same compound was prepared in higher yield (82%) by heating 6 g. of 3-chloro-5-methoxy-4-isothiazolecarbonitrile and 20 ml. of concentrated sulfuric acid on the steam bath for 10 minutes and allowing the reaction mixture to stand 18 hours at 33° C. The solution was then poured into ice-water and the precipitated solid was collected on a filter and slurried with 5 g. of sodium bicarbonate in 25 ml. of water. The insoluble portion was collected on a filter, dried in air and triturated with hot benzene. The benzene-insoluble portion was 3-chloro-5-methoxy-4-isothiazolecarboxamide.

EXAMPLE XXI

*3-Chloro-5-Methoxy-4-Isothiazolecarboxylic Acid*

A solution of 4.18 g. (0.0216 mole) of 3-chloro-5-methoxy-4-isothiazolecarboxamide in 70 ml. of 90% sulfuric acid was cooled in an ice-water bath. A solution of 2.22 g. (0.0326 mole) of sodium nitrite in 3 ml. of water was added slowly over a 15-minute period through a pipette that dipped below the surface of the sulfuric acid solution. After the addition was completed, the reaction mixture was warmed on the steam bath for 15 minutes with occasional shaking, allowed to stand 30 minutes at room temperature, and poured into an ice-water mixture. The precipitated solid was collected, slurried in an aqueous solution of sodium carbonate and filtered. The filtrate was extracted twice with diethyl ether and then acidified with dilute hydrochloric acid. The precipitated solid (2.5 g., M.P. 179.5–180.5° C.) was 3-chloro-5-methoxy-4-isothiazolecarboxylic acid,

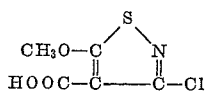

An additional 0.6 g. of the acid (total yield 63%) was obtained by extracting the aqueous sulfuric acid filtrate with ether, followed by extraction of the ether extract with aqueous sodium carbonate and acidification. An analytical sample recrystallized from water melted at 180–182° C. with decomposition.

*Analysis.*—Calc'd for $C_5H_4O_3NClS$: N, 7.24. Found: N, 7.40.

The infrared and ultraviolet spectra were consistent with the assigned structure.

EXAMPLE XXII

*Methyl 3-Chloro-5-Methoxy-4-Isothiazolecarboxylate*

To a slurry of 2.5 g. of 3-chloro-5-methoxy-4-isothiazolecarboxylic acid in 25 ml. of anhydrous diethyl ether was added dropwise a solution of diazomethane in diethyl ether prepared according to Organic Syntheses, vol. 36, p. 16. The diazomethane solution was added until the reaction mixture showed a permanent yellow color. Evaporation of the ether gave 2.6 g. of oily residue that soon crystallized. This product, which melted at about 70° C., was methyl 3-chloro-5-methoxy-4-isothiazolecarboxylate.

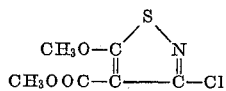

An analytical sample recrystallized from cyclohexane as sharp needles that melted at 72–73° C.

*Analysis.*—Calc'd for $C_6H_6O_3NClS$: N, 6.74. Found: N, 6.78.

The infrared and ultraviolet spectra were consistent with the assigned structure.

EXAMPLE XXIII

*3,5-Dichloro-4-Isothiazolecarboxylic Acid*

A solution prepared from 5.91 g. (0.02 mole) of 3,5-dichloro-4-isothiazolecarboxamide in 40 ml. of concentrated sulfuric acid and 10 ml. of water was cooled with stirring to 5–10° C. Through a tube dipping below the surface of the solution was added a solution of 3.1 g. (0.045 mole) of sodium nitrite in 10 ml. of water while the mixture was stirred at 10–15° C. over a period of 15 minutes. The reaction mixture was stirred 30 minutes at room temperature and then warmed at 50–60° C. on a steam bath when much foaming occurred. After foaming had subsided, the reaction mixture was poured into a mixture of ice and water and the precipitated solvent was collected on a filter. The solid product was dissolved in aqueous alkali, treated with decolorizing charcoal, filtered and reprecipitated by the addition of acid. Filtration of the solid precipitate gave 4.6 g. (77% yield) of 3,5-dichloro-4-isothiazolecarboxylic acid,

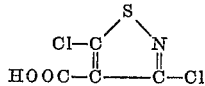

as a product which melted at 149.5–155.5° C. An analytical sample crystallized from benzene melted at 155–156° C.

*Analysis.*—Calc'd for $C_4HO_2NSCl_2$: N, 7.07; mol. wt., 198.04. Found: N, 6.99; mol. wt., 198.

The infrared spectrum showed broad absorption in the 3–4μ region along with absorption at 5.9μ typical of a carboxylic acid. The ultraviolet spectrum in alcohol showed maximum absorption at 259 mμ (ε=6540).

EXAMPLE XXIV

*3,5-Dichloro-4-Isothiazolecarbonyl Chloride*

A mixture of 10 g. of 3,5-dichloro-4-isothiazolecarboxylic acid and 25 ml. of thionyl chloride was heated under reflux for 6 hours, allowed to stand overnight, and concentrated at reduced pressure to remove the thionyl chloride. The residual oil was distilled at reduced pressure giving 7.5 g. of distillate boiling between 101–103° C. at 8 mm.; $n_D^{25}$ 1.5945.

The infrared absorption spectrum for the product was compatible with the acid halide structure. A small quantity of product on treatment with ammonium hydroxide yielded a white solid, M.P. 166–167° C., which was shown to be identical to a known sample of 3,5-dichloro-4-isothiazolecarboxamide. The product was thus identified as 3,5-dichloro-4-isothiazolecarbonyl chloride,

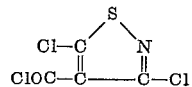

By substituting other halogenating agents, e.g., thionyl bromide, for thionyl chloride in the above process, other carbonyl halides, e.g., carbonyl bromides, may be readily prepared.

EXAMPLE XXV

*Methyl 3,5-Dichloro-4-Isothiazolecarboxylate*

One gram of 3,5-dichloro-4-isothiazole carbonyl chloride was mixed with 15 ml. of methanol, allowed to stand at room temperature for 30 minutes and then evaporated on a steam bath. The residue was taken up in ether and the ether solution was washed with water, sodium carbonate solution, sodium chloride solution and dried over magnesium sulfate. Evaporation of the ether gave 0.88 g. (95% yield) of methyl 3,5-dichloro-4-isothiazolecarboxylate,

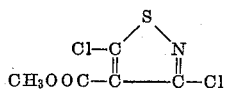

as a white solid melting at 35.6–36.6° C. An analytical sample was recrystallized from petroleum ether.

*Analysis.*—Calc'd for $C_5H_3O_2NCl_2S$: C, 28.46; H, 1.43. Found: C, 28.75; H, 1.76.

IR: 3.37μ (sat. CH), 5.76μ (C=O), 6.66μ and 7.41μ (isothiazole), 8.05μ, 8.20μ, 9.30μ, 10.18μ;

UV: $\lambda_{max.}^{alc.}$ 258 mμ (ε=6100).

EXAMPLE XXVI

*3,5-Dichloro-4-Isothiazolecarboxanilide*

To a solution of 2.16 g. of 3,5-dichloro-4-isothiazolecarbonyl chloride in 100 ml. of ethyl ether was added dropwise 1.9 g. of aniline. The mixture was stirred at room temperature for 15 minutes, then extracted with water, dilute hydrochloric acid and dried over magnesium sulfate. Evaporation of the ether and recrystallization of the residue from a benzene-cyclohexane mixture gave 2.55 g. (94% yield) of white product melting at 143.5–144.5° C. This was 3,5-dichloro-4-isothiazole-carboxanilide,

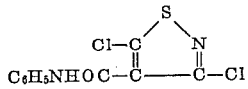

Analysis.—Calc'd for $C_{10}H_6ON_2Cl_2S$: C, 43.97; H, 2.21. Found: C, 44.26; H. 2.45.
IR: 3,07µ (NH), 3.27µ (=CH), 6.05µ and 6.47µ (sec. amide), 6.15µ, 6.23µ, and 6.74µ (conj. cyc. C=C), 6.60µ, 6.90µ, 7.4µ, 13.35µ and 14.47µ (monosub. arom.);

UV: $\lambda_{max}^{alc.}$ 254 mµ ($\epsilon = 16,000$).

EXAMPLE XXVII

*3-Chloro-5-Dimethylamino-4-Isothiazolecarboxanilide*

Anhydrous dimethylamine gas was passed into a refluxing solution of 1.32 g. (0.0484 mole) of 3,5-dichloro-4-isothiazolecarboxanilide in 150 ml. of tetrahydrofuran for 5 hours and the reaction mixture was allowed to stand 18 hours. Filtration and evaporation of the filtrate gave 1.24 g. (92% yield) of 3-chloro-5-dimethylamino-4-isothiazolecarboxanilide,

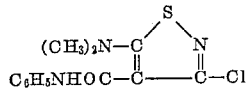

as a white solid melting at 150–152° C.
Analysis.—Calc'd for $C_{12}H_{12}ON_3ClS$: C, 51.15; H, 4.30. Found: C, 51.36; H, 4.52.
IR: 3.07µ (NH), 3.26µ (=CH), 3.37µ and 3.42µ (sat. C—H), 6.05µ and 6.45µ (sec. amide), 6.15µ, 6.23µ and 6.74µ (conj. cyc. C=C and/or C=N), 13.25µ and 14.55µ (monosub. arom.);

UV: $\lambda_{max}^{alc.}$ sh. 280 mµ ($\epsilon = 17,500$), 255 mµ ($\epsilon = 21,400$).

EXAMPLE XXVIII

*N-Methyl-3,5-Dichloro-4-Isothiazolecarboxamide*

Gaseous methylamine was passed into a solution of 2.67 g. of 3,5-dichloro-4-isothiazolecarbonyl chloride in 200 ml. of ethyl ether for several minutes. The ether slurry was washed with water, aqueous sodium carbonate and saturated sodium chloride solution and dried over magnesium sulfate. Evaporation of the ether gave 2.4 g. (93% yield) of N-methyl-3,5-dichloro-4-isothiazolecarboxamide,

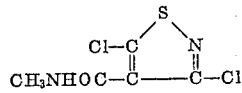

M.P. 105–106° C. after recrystallization from a benzene-hexane mixture.
Analysis.—Calc'd for $C_5H_4ON_2SCl_2$: C, 28.45; H, 1.91. Found: C, 28.99; H, 2.29.
IR: 3.05µ (NH), 3.4µ (sat. CH), 6.07µ and 6.4µ (sec. amide), 6.65µ and 7.54µ (isothiazole), 7.75µ, 8.65µ, 10.60µ, 11.9µ;

UV: $\lambda_{max}^{alc.}$ 256 mµ ($\epsilon = 7230$).

EXAMPLE XXIX

*o-(3,5-Dichloro-4-Isothiazolecarboxy)Toluide*

To a solution of 6.3 g. (0.029 mole) of 3,5-dichloro-4-isothiazolecarbonyl chloride in 250 ml. of tetrahydrofuran was added over 15 minutes at 15–20° C. a solution of 3.02 g. (0.029 mole) of o-toluidine, 2.94 g. (0.029 mole) of triethylamine and 25 ml. of tetrahydrofuran. The reaction mixture was stirred for 2 hours at room temperature and then filtered. Evaporation of the filtrate and trituration of the residue in ethyl ether gave 7.74 g. (93% yield) of ether insoluble product that melted at 173–174.5° C. This was o-(3,5-dichloro-4-isothiazolecarboxy)toluide,

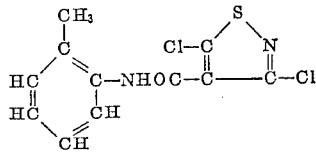

Analysis.—Calc'd for $C_{11}H_8ON_2Cl_2S$: C, 46.01; H, 2.81. Found: C, 45.97; H, 2.89.
IR: 3.05µ (NH), 3.28µ (arom. CH), 3.40µ and 3.48µ (sat. CH), 6.03µ and 6.47µ (sec. amide), 6.18µ, 6.26µ, 6.59µ and 6.71µ (arom.), 6.83µ, 7.42µ (isothiazole), 13.15µ (o-sub. arom.);

UV: $\lambda_{max}^{alc.}$ 256 mµ ($\epsilon = 10,820$), 228 mµ ($\epsilon = 10,380$).

EXAMPLE XXX

*o-(3-Chloro-5-Methylamino-4-Isothiazolecarboxy)Toluide*

Gaseous methylamine was passed for 4 hours into a refluxing solution of 1.43 g. (0.005 mole) of o-(3,5-dichloro-4-isothiazolecarboxy)toluide in 125 ml. of tetrahydrofuran. The reaction mixture was filtered and the filtrate was evaporated to give a white crystalline residue weighing 1.33 g. (98% yield) of o-(3-chloro-5-methylamino-4-isothiazolecarboxy)toluide,

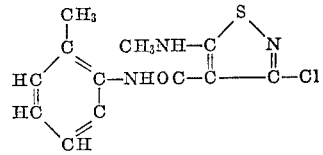

M.P. 131%133° C. An analytical sample was recrystallized from a mixture of methanol and ethanol.
Analysis.—Calc'd for $C_{12}H_{12}ON_3ClS$: C, 51.16; H, 4.30. Found: C, 50.71; H, 4.32.

EXAMPLE XXXI

*o-Amino-3, 5-Dichloro-4-Isothiazolecarboxanilide*

A mixture of 2.16 g. (0.01 mole) of 3,5-dichloro-4-isothiazolecarbonyl chloride and 10 ml. of tetrahydrofuran was added to a solutlion of 1.08 g. (0.01 mole) of o-phenylenediamine, 1.01 g. (0.01 mole) of triethylamine and 25 ml. of tetrahydrofuran. The mixture was stirred at room temperature during the addition and for 30 minutes afterward. Filtration of the reaction mixture, evaporation of the filtrate, and trituration of the residue in methanol gave 2.4 g. (83% yield) of o-amino-3,5-dichloro-4-isothiazolecarboxanilide,

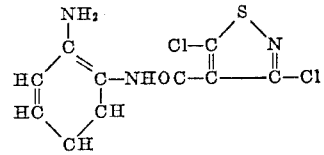

M.P. 160–176° C. Recrystallization from hot benzene gave 1.5 g. (53% yield) of purified product melting at 181–183° C. An analytical sample recrystallized from a mixture of methanol and benzene melted at 187–188° C.
Analysis.—Calc'd for $C_{10}H_7ON_3Cl_2S$: C, 41.67; H, 2.45. Found: C, 42.39; H, 2.75.
IR: 2,95µ, 3.01µ and 3.17µ (NH and $NH_2$), 3.3µ (=CH), 6.0µ and 6.45µ (sec. amide), 6.24µ, 6.61µ and 6.75µ (conj. C=C and/or C=N);

UV: $\lambda_{max}^{alc.}$ 298 mµ ($\epsilon = 3830$), 260 mµ ($\epsilon = 9210$).

EXAMPLE XXXII

*2-(o-3,5-Dichloroisothiazolecarboxamidophenyl)-2H-Benzotriazole*

To a mixture of 2.10 g. (0.01 mole) of 2-(o-aminophenyl)-2H-benzotriazole, 1.01 g. (0.01 mole) of triethylamine and 50 ml. of tetrahydrofuran was added a solution of 2.16 g. (0.01 mole) of 3,5-dichloro-4-isothiazolecarbonyl chloride in 10 ml. of tetrahydrofuran dropwise over 15 minutes at room temperature. The reaction mixture was stirred under reflux for one hour and then evaporated at reduced pressure. The residue was mixed with water and the insoluble portion was collected on a filter. Recrystallization of the dried solid from a benzene-petroleum ether mixture gave 1.47 g. (38% yield) of product melting at 144–144.5° C. This was 2-(o-3,5-dichloroisothiazolecarboxamidophenyl)-2H-benzotriazole,

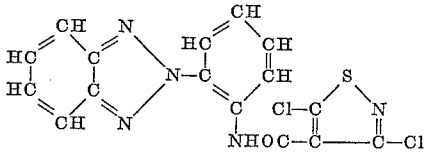

Analysis.—Calc'd for $C_{16}H_9ON_5Cl_2S$: C, 49.24; H, 2.33. Found: C, 49.78; H, 2.55.

IR: $3.05\mu$ (NH), $3.25\mu$ (=CH), $5.92\mu$ and $6.55\mu$ (sec. amide), $6.24\mu$, $6.39\mu$, $6.65\mu$ and $6.73\mu$ (conj. cyc. C=C and/or C=N);

UV: $\lambda_{max}^{alc.}$ 298 m$\mu$ ($\epsilon$=16,500), 264 m$\mu$ ($\epsilon$=15,000), 228 m$\mu$ ($\epsilon$=25,000).

The reactant used in this example, 2-(o-aminophenyl)-2H-benzotriazole, may be prepared by treating o,o'-diaminoazobenzene with an oxidizing agent, for example, cupric sulfate, in a nitrogen-containing solvent for the oxidizing agent. A typical preparation is as follows:

o,o'-Diaminoazobenzene (4.4 g.) was dissolved in 50 ml. of pyridine. To this solution there was added in portions with stirring 12.8 g. of anhydrous copper sulfate at room temperature. After 30 minutes at room temperature, the reaction mixture was heated on a steam bath for one hour. The pyridine solution was cooled and poured into four volumes of ice water and this mixture was extracted with four 150-ml. portions of diethyl ether. The four ether extracts were combined, treated with activated carbon and dried over anhydrous sodium sulfate. The extract was evaporated to dryness, leaving a yellow oil which solidified on cooling. Petroleum ether was added to this solid and the slurry was filtered. The remaining crystalline solid was taken up in hot ethanol. On cooling, yellow crystals separated and were collected. This was 2-(o-aminophenyl)-2H-benzotriazole,

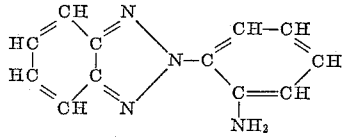

M.P. 97–98° C., which was obtained in 64% yield.

EXAMPLE XXXIII 2-(o-3-Chloro-5-Methylamino-4-Isothiazolecarboxamidophenyl)-2H-Benzotriazole Gaseous monomethylamine was passed into a solution of 0.23 g. of 2-(o-3,5-dichloroisothiazolecarboxamidophenyl)-2H-benzotriazole in 25 ml. of tetrahydrofuran for 30 minutes and the flask was stoppered and allowed to stand for 1.5 hours. The slurry thus obtained was filtered and the filtrate evaporated to give 0.16 g. of residual crystals which melted at 199–201° C. after recrystallization from a benzene-petroleum ether mixture. This was 2 - (o-3-chloro-5-methylamino-4-isothiazolecarboxamidophenyl)-2H-benzotriazole,

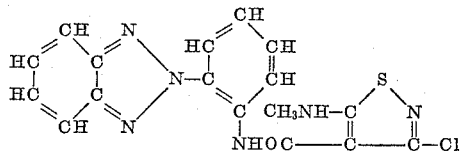

Analysis.—Calc'd for $C_{17}H_{13}ON_6ClS$: C, 53.05; H, 3.40; N, 21.84. Found: C, 54.01; H, 3.63; N, 21.50.

IR: $3.05\mu$ (NH), $3.27\mu$ (=CH), $3.42\mu$ (sat. CH), $6.08\mu$, and $6.55\mu$ (sec. amide), $6.26\mu$, $6.37\mu$ and $6.75\mu$ (conj. cyc. C=C and/or C=N).

While this invention has been illustrated in the foregoing examples with respect to certain specific compounds, it is generic to the compounds having the general Formula I set forth above. Additional examples of products falling within this class which can be prepared by the described methods include the following: the 3-chloro (or bromo) -5-substituted-4-isothiazolecarbonitrile where the substituent in the 5-position is tert.-butoxy, n-dodecyloxy, crotyloxy, propargyloxy, cyclopentyloxy, 2-chloroethoxy, 2,2,3,3-tetrafluoropropoxy, p-chlorobenzyloxy, phenoxy, and α-naphthoxy, which can be prepared by the processes of Examples V–VII; the 3-chloro (or bromo) -5-substituted-4-isothiazolecarbonitriles where the substituent in the 5-position is n-propylthio, n-hexylthio, cyclohexylthio, allylthio, benzylthio, o-bromophenylthio and m-trifluoromethylphenylthio, which can be prepared by the process of Examples VIII–IX; the 3-chloro (or bromo) -5-substituted-4-isothiazolecarbonitriles where the substituent in the 5-position is N,N-diethylamino, N-ethyl-N-(n-hexyl)-amino, n-dodecylamino, methallylamino, N,N-dicyclohexylamino, α-phenylethylamino, α-bromopropylamino, o-vinylanilino and m-iodoanilino, which can be prepared by the processes of Examples X–XV; the 3-chloro (or bromo) -5-susbtituted-4-isothiazolecarbonitriles where the substituent in the 5-position is β-ethylhydrazino, β-(n-octyl)hydrazino, β-allylhydrazino, β-benzylhydrazino and β-(p-fluorophenyl)hydrazino, which can be prepared by the processes of Examples XVI–XVII; the 3-chloro (or bromo) -5-substituted-4-isothiazolecarboxamides where the substituent in the 5-position is ethoxy, isobutoxy, phenoxy, phenylthio, p-chloroanilino, methylamino, dodecylamino, N,N-diethylamino, and hydrazino, which can be prepared by the process of Examples XVIII–XX; the 3-chloro (or bromo) -5-substituted-4-isothiazolecarboxylic acids where the substituent in the 5-position is chloro, bromo, butoxy, α-naphthoxy, o-bromophenylthio, N,N-diethylamino and N-methylanilino, which can be prepared by the process of Examples XXI and XXIII, and the acid halides of these acids, particularly the chlorides, which can be prepared by the process of Example XXIV; the amides of the above acids, especially with acyclic hydrocarbylamines of 1 to 12 carbon atoms or carbocyclic amines of 6 to 12 carbon atoms, i.e., the 3-chloro (or bromo) -4,5-disubstituted isothiazoles where the substituent in the 5-position is any of those mentioned above and the amido radical in the 4-position is, for example, N-ethylcarbamoyl, N,N-diethylcarbamoyl, N-isopropylcarbamoyl, N-(n-octyl)-carbamoyl, N-(n-dodecyl)carbamoyl, N-cyclohexylcarbamoyl, N-benzylcarbamoyl, N-(o-butylphenyl)carbamoyl, N-methyl-N-phenylcarbamoyl or N-(α-naphthyl)carbamoyl, which can be prepared by the process of Examples XXVI–XXXIII; and the esters of the above acids, especially with alcohols of 1 to 12 carbon atoms and phenols of 6 to 12 carbon atoms which are hydrocarbon except for the hydroxyl group, i.e., the 3-chloro (or bromo) -4,5-disubstituted isothiazoles where the substituent in the 5-position is any of those mentioned above and the ester group in the 4-position is, for example, ethoxycarbonyl, propoxycarbonyl, isopropoxycarbonyl, n-butoxycarbonyl, n-hexoxycarbonyl, allyloxycarbonyl, cyclohexoxycarbonyl, N-dodecoxycarbonyl, phenoxycarbonyl, α-naphthoxycarbonyl, or o-cresoxycarbonyl, which can be prepared by the process of Example XXV.

Preferred, because the reactants necessary to prepare them are more readily available, are products of this invention having the previously given formula

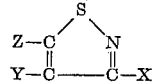

wherein X is chlorine or bromine; Y is one of the substituents —CN, —COOH, —COCl, —CONH₂, —CONHR', and —COOR', where R' is hydrocarbon of 1 to 12 carbon atoms, particularly aliphatically saturated hydrocarbon of 1 to 12 carbon atoms; and Z is one of the substituents X, —OR, —SR, —NH₂, —NHR, —NR₂, —NHNH₂, and —NHNHR, where R is a hydrocarbon or halohydrocarbon of 1 to 12 carbon atoms, particularly such groups which are aliphatically saturated. The most directly accessible, and therefore especially preferred products, are those having the above formula where Y is cyano, i.e., the 3-chloro (or bromo) -5-substituted-4-isothiazolecarbonitriles. The most useful individual compounds, because others are readily derived from them, are 3,5-dichloro-4-isothiazole-carbonitrile; 3,5-dichloro-4-isothiazolecarboxamide; 3,5-dichloro-4-isothiazolecarboxylic acid and 3,5-dichloro-4-isothiazolecarbonyl chloride.

As has been shown in the foregoing detailed examples, the products of this invention are generally useful pre-emergence or post-emergence herbicides and plant growth regulants. Furthermore, as has been shown, many of these products, especially the 3-halo-5-substituted-4-isothiazolecarbonitriles wherein the substitutent in the 5-position is halogen or an amino or hydrazino group, are useful as dye intermediates.

Since obvious modifications and equivalents in the invention will be evident to those skilled in the chemical arts, I propose to be bound solely by the claims.

The embodiments of the invention in which an exclusive property or privilege is claimed are defined as follows:

1. A compound of the formula

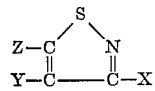

where X is selected from the class consisting of chlorine and bromine; Y is selected from the class consisting of cyano, carboxyl, halocarbonyl, carbamoyl, —CONHR¹, and —COOR², where R¹ is selected from the group consisting of hydrocarbon of 1–12 carbon atoms, aminophenyl, and o-(2-benzotriazolyl)phenyl, and R² is hydrocarbon of 1–12 carbon atoms; and Z is selected from the class consisting of X, OR, SR, NH₂ NHR, NR₂, NHNH₂ and NHNHR, where R is selected from the class consisting of hydrocarbon of 1–12 carbon atoms and halohydrocarbon of 1–12 carbon atoms.

2. 3,5-dichloro-4-isothiazolecarbonitrile.
3. 3,5-dibromo-4-isothiazolecarbonitrile.
4. 3,5-dichloro-4-isothiazolecarboxamide.
5. 3,5-dichloro-4-isothiazolecarboxylic acid.
6. 3,5-dichloro-4-isothiazolecarbonyl chloride.
7. The process of preparing isothiazoles which comprises contacting a halogenating agent selected from the class consisting of chlorine, bromine, thionyl chloride, thionyl bromide, sulfuryl chloride, sulfuryl bromide, phosphorus pentachloride, and phosphorus tribromide with an alkali metal salt of 2,2-dicyano-1,1-dimercaptoethylene in a molar ratio of at least 3:1.
8. The process of claim 7 wherein the halogenating agent is a free halogen.

References Cited in the file of this patent
UNITED STATES PATENTS
2,839,529   Adams et al. _____ June 17, 1958
2,871,243   Adams et al. _____ Jan. 27, 1959

OTHER REFERENCES
Adams et al.: Chem. Abstracts, vol. 54, col. 12113 (1960).